(12) United States Patent
Miyake

(10) Patent No.: US 11,396,321 B2
(45) Date of Patent: Jul. 26, 2022

(54) STEERING DEVICE

(71) Applicant: KYB Corporation, Tokyo (JP)

(72) Inventor: Soichiro Miyake, Aichi (JP)

(73) Assignee: KYB Corporation, Tokyo (JP)

( * ) Notice: Subject to any disclaimer, the term of this patent is extended or adjusted under 35 U.S.C. 154(b) by 806 days.

(21) Appl. No.: 16/218,479

(22) Filed: Dec. 13, 2018

(65) Prior Publication Data

US 2019/0202490 A1 Jul. 4, 2019

(30) Foreign Application Priority Data

Dec. 28, 2017 (JP) .............................. JP2017-253605

(51) Int. Cl.
| | | |
|---|---|---|
| B62D 3/12 | (2006.01) | |
| B62D 7/16 | (2006.01) | |
| B62D 21/00 | (2006.01) | |
| B62D 5/04 | (2006.01) | |
| F16H 55/26 | (2006.01) | |

(52) U.S. Cl.
CPC ............... B62D 3/126 (2013.01); B62D 3/12 (2013.01); B62D 5/0409 (2013.01); B62D 7/163 (2013.01); B62D 21/00 (2013.01); F16H 55/26 (2013.01)

(58) Field of Classification Search
CPC .......... B62D 3/12; B62D 3/123; B62D 3/126; B62D 5/22; B62D 5/0403; B62D 7/16; B62D 7/163; B62D 5/0409; B62D 21/00; F16H 55/26; F16H 55/283
USPC ...... 180/428, 444; 74/388 PS, 422; 280/779, 280/780, 93.515
See application file for complete search history.

(56) References Cited

U.S. PATENT DOCUMENTS

| | | | | |
|---|---|---|---|---|
| 4,008,627 A | * | 2/1977 | Bradshaw ................ | B62D 3/12 74/498 |
| 4,531,426 A | * | 7/1985 | Iijima ...................... | B62D 3/12 280/93.515 |
| 4,540,059 A | * | 9/1985 | Shibahata ................ | B62D 6/04 180/421 |
| 4,827,788 A | * | 5/1989 | Beer ........................ | B62D 3/12 280/93.515 |
| 6,149,197 A | * | 11/2000 | Ishii ........................ | B60G 7/02 280/784 |
| 8,590,908 B2 | * | 11/2013 | Kroger .................... | B62D 21/11 280/93.515 |

(Continued)

FOREIGN PATENT DOCUMENTS

JP 2013-141969 A 7/2013

*Primary Examiner* — Anne Marie M Boehler
(74) *Attorney, Agent, or Firm* — Hauptman Ham, LLP

(57) ABSTRACT

A steering device includes a rack shaft, a pair of tie rods, a rack housing portion, a pinion gear at one end of the rack housing portion, a first supporting portion to support the one end of the rack housing portion, and a second supporting portion to support the other end of the rack housing portion. The second supporting portion is movable in an axial direction of the rack housing portion from a proper position where the second supporting portion fixes the rack housing portion by being mounted on the vehicle body to an escaping position on the side of the pinion gear. The escaping position is a position where a distance from a tip of the tie rod on the other end of the rack housing portion to the second supporting portion is equal to or longer than twice the length of the tie rod.

3 Claims, 6 Drawing Sheets

(56) References Cited

U.S. PATENT DOCUMENTS

| | | | |
|---|---|---|---|
| 8,839,902 B1* | 9/2014 | Archer | B62D 5/14 |
| | | | 180/428 |
| 2002/0017419 A1* | 2/2002 | Oishi | B62D 3/12 |
| | | | 180/426 |
| 2010/0231005 A1* | 9/2010 | Yoshida | B62D 21/11 |
| | | | 296/203.02 |
| 2013/0180794 A1 | 7/2013 | Shiino et al. | |
| 2020/0140010 A1* | 5/2020 | Ross | F16F 3/12 |

* cited by examiner

STEERING DEVICE

RELATED APPLICATIONS

The present application claims priority to Japanese Application No. 2017-253605, filed on Dec. 28, 2017, the disclosure of which is hereby incorporated by reference herein in its entirety.

TECHNICAL FIELD

The present invention relates to a steering device.

BACKGROUND ART

JP2013-141969A describes a steering device provided in an engine compartment of a vehicle to apply a steering assist force to a turning wheel. In this steering device, mount bracket portions for mounting a rack tube on the side of a vehicle body are provided on both ends of the rack tube.

SUMMARY OF INVENTION

However, since a pair of the mount bracket portions are provided at positions symmetrical with respect to a center axis of the rack tube in the steering device described in JP2013-141969A, a part where the mount bracket portions are provided has a large width (external dimension in a direction perpendicular to the center axis of the rack tube). Thus, there is a problem of poor workability in mounting the steering device on the vehicle body. For example, if the rack tube has to be passed through an opening provided in a vehicle body frame, the mount bracket portions cannot be inserted into the opening depending on the size of the opening and it may not be possible to mount the steering device.

The present invention aims to provide a steering device excellent in mountability on a vehicle body.

According to one aspect of the present invention, A steering device, includes: a rack shaft configured to turn wheels; a pair of tie rods connected to both end parts of the rack shaft; a rack housing portion housing the rack shaft; a pinion gear provided on one end side of the rack housing portion, the pinion gear being configured to transmit a rotational force to the rack shaft; a first supporting portion provided on the rack housing portion, the first supporting portion being configured to support the one end side of the rack housing portion by being mounted on a vehicle body; and a second supporting portion provided on the rack housing portion, the second supporting portion being configured to support other end side of the rack housing portion by being mounted on the vehicle body. The second supporting portion is movable in an axial direction of the rack housing portion from a proper position to an escaping position on the side of the pinion gear, the proper position being a position where the second supporting portion fixes the rack housing portion by being mounted on the vehicle body, and the escaping position is a position where a distance from a tip of the tie rod on the other end side of the rack housing portion to the second supporting portion is equal to or longer than a length of twice the entire length of the tie rod.

DESCRIPTION OF EMBODIMENT

An embodiment of the present invention is described with reference to the drawings.

Figure 1:
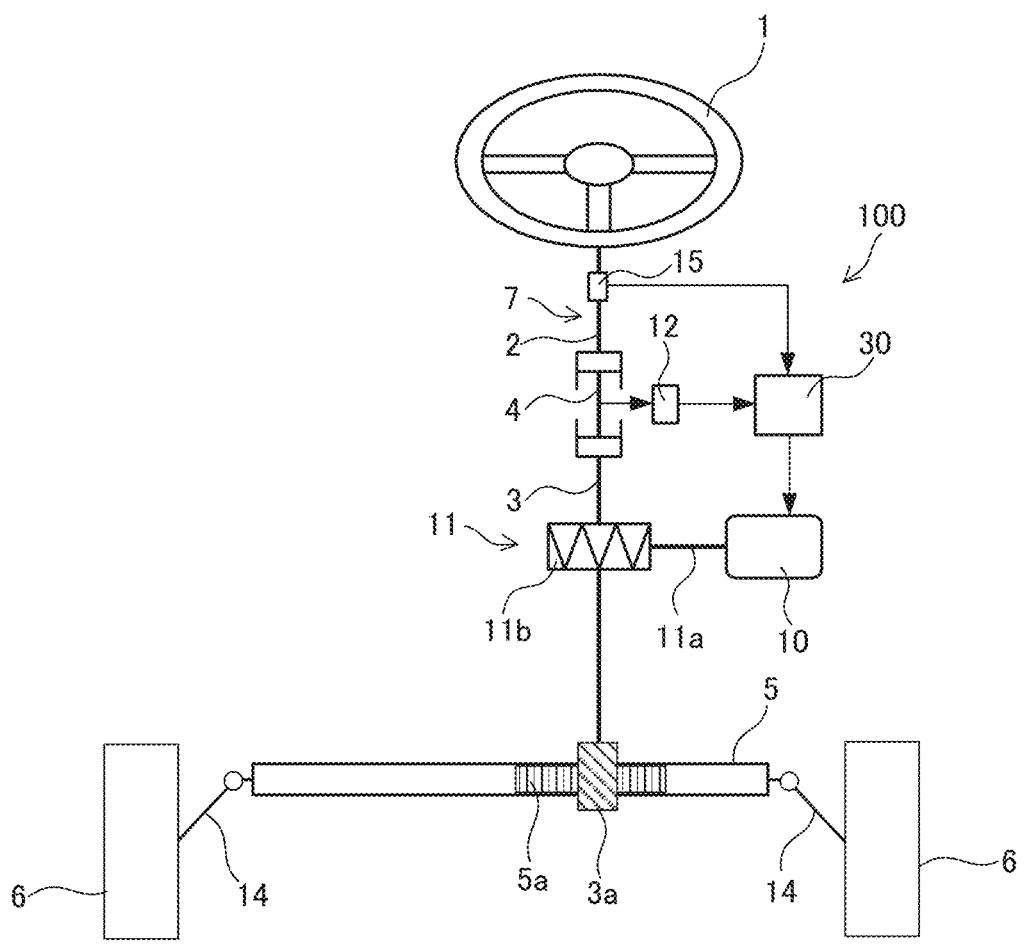
FIG. 1 is a configuration diagram of an electric power steering device according to an embodiment of the present invention.

FIG. 1 is a configuration diagram of an electric power steering device according to the embodiment of the present invention. As shown in FIG. 1, the electric power steering device (hereinafter, written as steering device) 100 includes an input shaft 2 configured to rotate as a driver operates a steering wheel 1, an output shaft 3 linked to a rack shaft 5 for turning wheels 6 and a torsion bar 4 coupling the input shaft 2 and the output shaft 3. A steering shaft 7 is constituted by the input shaft 2, the output shaft 3 and the torsion bar 4.

The output shaft 3 is formed with a pinion gear 3a meshed with a rack gear 5a formed on the rack shaft 5 to transmit a rotational force to the rack shaft 5. When the steering wheel 1 is operated, the steering shaft 7 rotates, the rotation thereof is translated into a linear motion of the rack shaft 5 by the pinion gear 3a and the rack gear 5a, and the wheels 6 are turned via tie rods 14.

The steering device 100 further includes an electric motor 10 serving as a power source for assisting the operation of the steering wheel 1 by the driver, a speed reducer 11 for decelerating and transmitting the rotation of the electric motor 10 to the steering shaft 7, a torque sensor 12 for detecting a torque acting on the torsion bar 4 by the relative rotation of the input shaft 2 and the output shaft 3 according to the steering operation by the driver, and a controller 30 for controlling the drive of the electric motor 10 on the basis of a detection result of the torque sensor 12.

The electric motor 10 is a brushed motor. The speed reducer 11 includes a worm shaft 11a coupled to an output shaft of the electric motor 10 and a worm wheel 11b coupled to the output shaft 3 and meshed with the worm shaft 11a. A torque output by the electric motor 10 is transmitted from the worm shaft 11a to the worm wheel 11b and applied as a steering assist torque to the output shaft 3.

A steering torque applied to the input shaft 2 according to the steering operation by the driver is detected by the torque sensor 12, and the torque sensor 12 outputs a voltage signal corresponding to that steering torque to the controller 30. The controller 30 calculates the torque output by the electric motor 10 on the basis of the voltage signal from the torque sensor 12 and controls the drive of the electric motor 10 so that the calculated torque is generated. In this way, the steering device 100 detects the steering torque applied to the input shaft 2 by the torque sensor 12 and assists the steering operation of the driver by controlling the drive of the electric motor 10 on the basis of the detection result by the controller 30.

The controller 30 controls the drive of the electric motor 10 in consideration of a steering angle detected by a steering angle sensor 15 in addition to the steering torque. When the electric motor 10 is driven, a rotational force of the electric motor 10 is transmitted to the rack shaft 5 via the speed reducer 11 and the pinion gear 3a.

Figure 2:
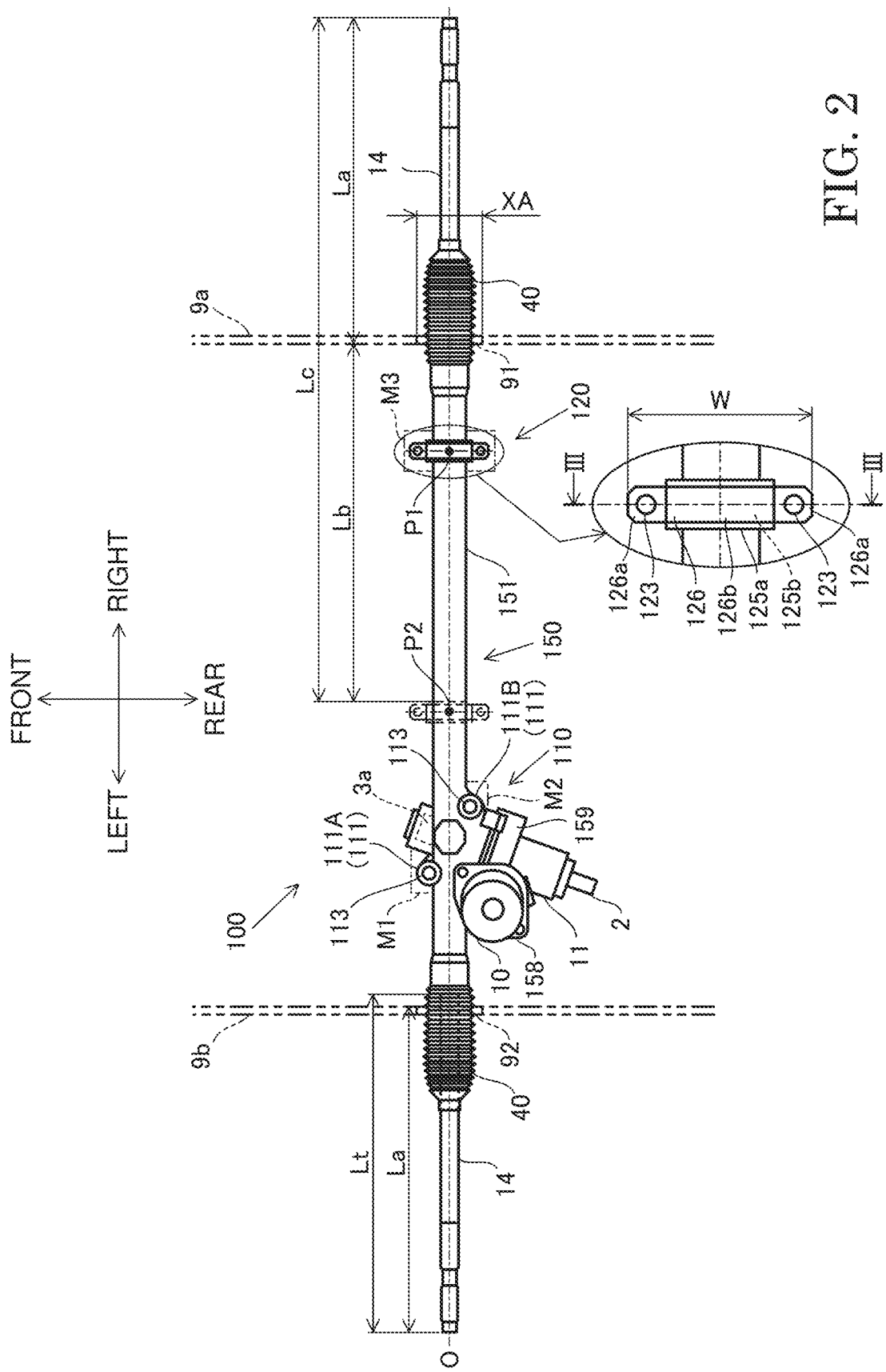
FIG. 2 is a plan view of the electric power steering device according to the embodiment of the present invention.

A housing 150 of the steering device 100 is described with reference to FIG. 2. It should be noted that front-rear and lateral directions of the steering device 10 are specified in accordance with front-rear and lateral directions of a vehicle body as shown for the convenience of description. The front-rear and lateral directions of the vehicle body are directions parallel to a horizontal direction perpendicular to a vertical direction. FIG. 2 is a plan view of the steering device 100 according to the embodiment of the present invention. In FIG. 2, side plates 9a, 9b constituting parts of a vehicle body frame and mounting seats M1, M2 and M3 of the steering device 100 are shown by chain double-dashed line.

The housing 150 includes a rack tube 151 serving as a rack housing portion for housing the rack shaft 5 (see FIG. 1) extending straight along the lateral direction of the vehicle body, a motor housing 158 for housing the electric motor 10 (see FIG. 1) and a gear housing 159 for housing the speed reducer 11 and the pinion gear 3a (see FIG. 1). It should be noted that a direction parallel to a center axis O of the rack shaft 5 is called an axial direction. Since the rack shaft 5 and the rack tube 151 are concentric, the center axis O is also a center axis of the rack tube 151.

The rack tube 151 is formed into a hollow cylindrical shape open on both axial ends. The rack shaft 5 is passed through the rack tube 151 and both end parts thereof project from the both axial ends of the rack tube 151. Both right and left end parts of the rack shaft 5 are connected to a pair of right and left tie rods 14. That is, the both end parts of the rack shaft 5 are respectively coupled to the wheels 6 on right and left sides via the tie rods 14. Connecting portions the rack shaft 5 with the tie rods 14 are covered by steering rack boots 40.

The gear housing 159 is mounted on one axial end side of the rack tube 151, and the motor housing 158 is mounted on the gear housing 159. It should be noted that the one axial end side of the rack tube 151 means a left side from a lateral center of the rack tube 151, and the other axial end side of the rack tube 151 means a right side from the lateral center of the rack tube 151.

A first supporting portion 110 for supporting the one axial end side of the rack tube 151 is provided on the one axial end side of the rack tube 151. A second supporting portion 120 for supporting the other axial end side of the rack tube 151 is provided on the other axial end side of the rack tube 151. The first and second supporting portions 110, 120 are mounted on the mounting seats M1, M2 and M3 of the vehicle body frame by bolts and nuts. In this way, the steering device 100 is supported on both ends of the vehicle body.

The first supporting portion 110 includes an outer bolt mounting portion 111A to be mounted on the mounting seat M1 of the vehicle body frame and an inner bolt mounting portion 111B to be mounted on the mounting seat M2 of the vehicle body frame. The outer and inner bolt mounting portions 111A, 111B are formed at both right and left sides of the gear housing 159 across the gear housing 159. The outer bolt mounting portion 111A is provided to project toward an outer front side of the rack tube 151, and the inner bolt mounting portion 111B is provided to project toward an outer rear side of the rack tube 151. Specifically, the outer and inner bolt mounting portions 111A, 111B project in directions opposite to each other.

The outer bolt mounting portion 111A is arranged on a side closer to the left end of the rack tube 151 than the gear housing 159, i.e. on an axially outer side. The inner bolt mounting portion 111B is arranged on a side closer to the lateral center of the rack tube 151 than the gear housing 159, i.e. on an axially inner side. Since each of the outer and inner bolt mounting portions 111A, 111B has a similar hollow cylindrical shape, the both are also collectively written as bolt mounting portions 111 below.

The bolt mounting portion 111 is provided with a bolt mounting hole 113 into which the bolt is to be mounted. The bolt mounting hole 113 vertically extends at a position separated by a predetermined distance in the front-rear direction from the center axis O of the rack shaft 5. A vertical dimension (height) of the bolt mounting portion 111 is larger than an outer diameter of the rack tube 151. A lower end part of the bolt mounting portion 111 has a hollow cylindrical shape and projects further downward than the lower end surface of the rack tube 151. The outer surface of the bolt mounting portion 111 is a curved surface arcuate in a plan view.

Figure 3:
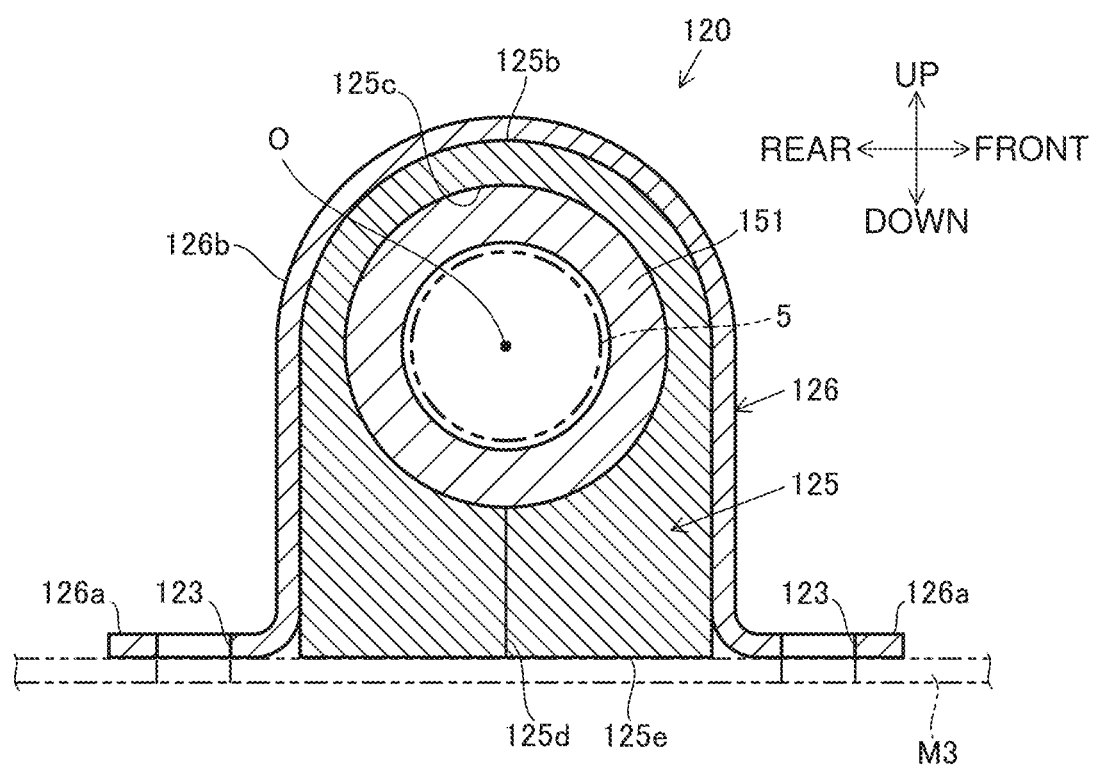
FIG. 3 is a cross-sectional view of a second supporting portion along line III-III of FIG. 2.

The second supporting portion 120 is described with reference to FIGS. 2 and 3. FIG. 3 is a cross-sectional view of the second supporting portion 120 along line III-III of FIG. 2. For the convenience of description, the vertical and front-rear directions of the steering device 100 are defined as shown. It should be noted that the rack shaft 5 is shown by chain double-dashed line.

The second supporting portion 120 includes a mounting rubber 125 serving as a mount member having a circular opening 125c, which is a circular opening through which the rack tube 151 is to be inserted, and a bracket 126 for mounting the rack tube 151 on the mounting seat M3 of the vehicle body frame via the mounting rubber 125. The mounting rubber 125 is a bearing formed of elastically deformable rubber and having a D-shaped cross section, and the circular opening 125c is a through hole penetrating through the mounting rubber 125 in the axial direction.

An upper part of the mounting rubber 125 above the center axis O of the rack shaft 5 has a semicircular cross-sectional shape, and a lower part thereof below the center axis O has a rectangular cross-sectional shape. The lower part below the center axis O extends up to the mounting seat M3 and the lower end surface (bottom surface) thereof is a flat contact surface 125e to be brought into contact with the mounting seat M3.

The mounting rubber 125 is a flanged rubber bush provided with flanges 125a respectively on both axial ends. A recessed portion 125b recessed toward the center axis O is formed between a pair of the flanges 125a.

The bracket 126 is formed by bending a plate member made of metal. The bracket 126 includes a pair of contact portions 126a to be brought into contact with the mounting seat M3 and a pressing portion 126b formed between the pair of contact portions 126a. The pressing portion 126b has a U-shaped cross section, and is fitted into the recessed portion 125b provided along the outer periphery of the mounting rubber 125. Each of the pair of contact portions 126a is formed with a bolt mounting hole 123 through which the bolt (not shown) is to be inserted.

The bracket 126 is fastened to the mounting seat M3 by attaching nuts to external threads formed on tip parts of the bolts after the bolts (not shown) are inserted through the bolt mounting holes 123 of the contact portions 126a of the bracket 126 and bolt mounting holes of the mounting seat M3. In this way, the mounting rubber 125 is sandwiched by the pressing portion 126b of the bracket 126 and the mounting seat M3, and the rack tube 151 held by the mounting rubber 125 is fixed at a predetermined position. Since the other end (right end) side of the rack tube 151 is mounted on the mounting seat M3 while being supported by the elastically deformable mounting rubber 125, vibration and impact are absorbed by the mounting rubber 125.

The pair of contact portions 126a of the bracket 126 are arranged to project forwardly and rearwardly of the rack tube 151 (i.e. toward sides opposite to each other) while being mounted on the vehicle body. In this way, the mounting rubber 125 can be equally pressed downward and the rack tube 151 can be stably held.

As shown in FIG. 3, the mounting rubber 125 is formed with a cut 125d extending from the inner peripheral surface of the circular opening 125c to the contact surface 125e over the entire length of the mounting rubber 125 in the axial direction.

A worker can mount the mounting rubber 125 on the rack tube 151 and remove the mounting rubber 125 from the rack tube 151 by opening the cut 125d of the mounting rubber 125. The worker fits the bracket 126 to the recessed portion 125b of the mounting rubber 125 after mounting the mounting rubber 125 on the rack tube 151. In this way, the second supporting portion 120 is mounted on the rack tube 151. The second supporting portion 120 is movable along the axial direction of the rack tube 151 in a state where the bracket 126 is not mounted on the mounting seat M3 by the bolts and nuts.

As shown in FIG. 2, the rack tube 151 is formed into a hollow cylindrical shape having a uniform outer diameter from a proper position (point P1) on the other end side of the second supporting portion 120 to the first supporting portion 110 and includes no projecting part projecting outward from a cylindrical outer peripheral surface. Thus, the worker can easily move the second supporting portion 120 along the outer peripheral surface of the rack tube 151.

The second supporting portion 120 is arranged at the proper position (point P1) on the right end side of the rack tube 151 with the steering device 100 mounted on the vehicle body. The second supporting portion 120 is mounted on the vehicle body at the proper position (point P1) to fix the rack tube 151. It should be noted that the second supporting portion 120 is temporarily arranged at an escaping position (point P2) during an operation of mounting the steering device 100 on the vehicle body as described later.

The proper position (point P1) is the position of the second supporting portion 120 when the steering device 100 is mounted on the vehicle body, and the bolt mounting holes of the mounting seat M3 of the vehicle body and the bolt mounting holes 123 of the second supporting portion 120 coincide at the proper position. The escaping position (point P2) is a position where the second supporting portion 120 is arranged in advance at the time of the operation of mounting the steering device 100 on the vehicle body. The escaping position (point P2) is located to the right side of the inner bolt mounting portion 111B of the first supporting portion 110 and to the left side of an axial center of the rack tube 151. The second supporting portion 120 is movable in the axial direction of the rack tube 151 at least in a range from the proper position (point P1) to the escaping position (point P2) while being kept mounted on the rack tube 151.

It is assumed that Lb denotes an axial distance between the right side surface of the second supporting portion 120 and the left side surface (inner side surface) of the right side plate 9a when the second supporting portion 120 is arranged at the escaping position (point P2). The axial distance Lb is at least longer than an axial distance La from the right side surface (inner side surface) of the left side plate 9b to the tip of the left tie rod 14 (Lb>La). In the present embodiment, the escaping position (point P2) is so set that the axial distance Lb is longer than an entire length Lt of the tie rod 14 (Lb>Lt). It should be noted that a mark (engraved mark, paint or the like) indicating the position is affixed at each of the proper position (point P1) and the escaping position (point P2) of the rack tube 151.

The vehicle body frame includes the pair of right and left side plates 9a, 9b parallel to the front-rear direction and the vertical direction. Each of the side plates 9a, 9b is provided with a square opening 91, 92. A front-to-rear dimension (opening width) XA of each of the openings 91, 92 is smaller than a front-rear width W of the bracket 126 (XA<W). It should be noted that the front-rear width is an external dimension in a front-rear horizontal direction perpendicular to the center axis) of the rack shaft 5. As shown in FIG. 2, the steering device 100 is fastened and fixed to the mounting seats M1, M2 and M3 of the vehicle body frame by the bolts and nuts (not shown) while being inserted through the openings 91, 92 of the pair of side plates 9a, 9b.

Figure 4:
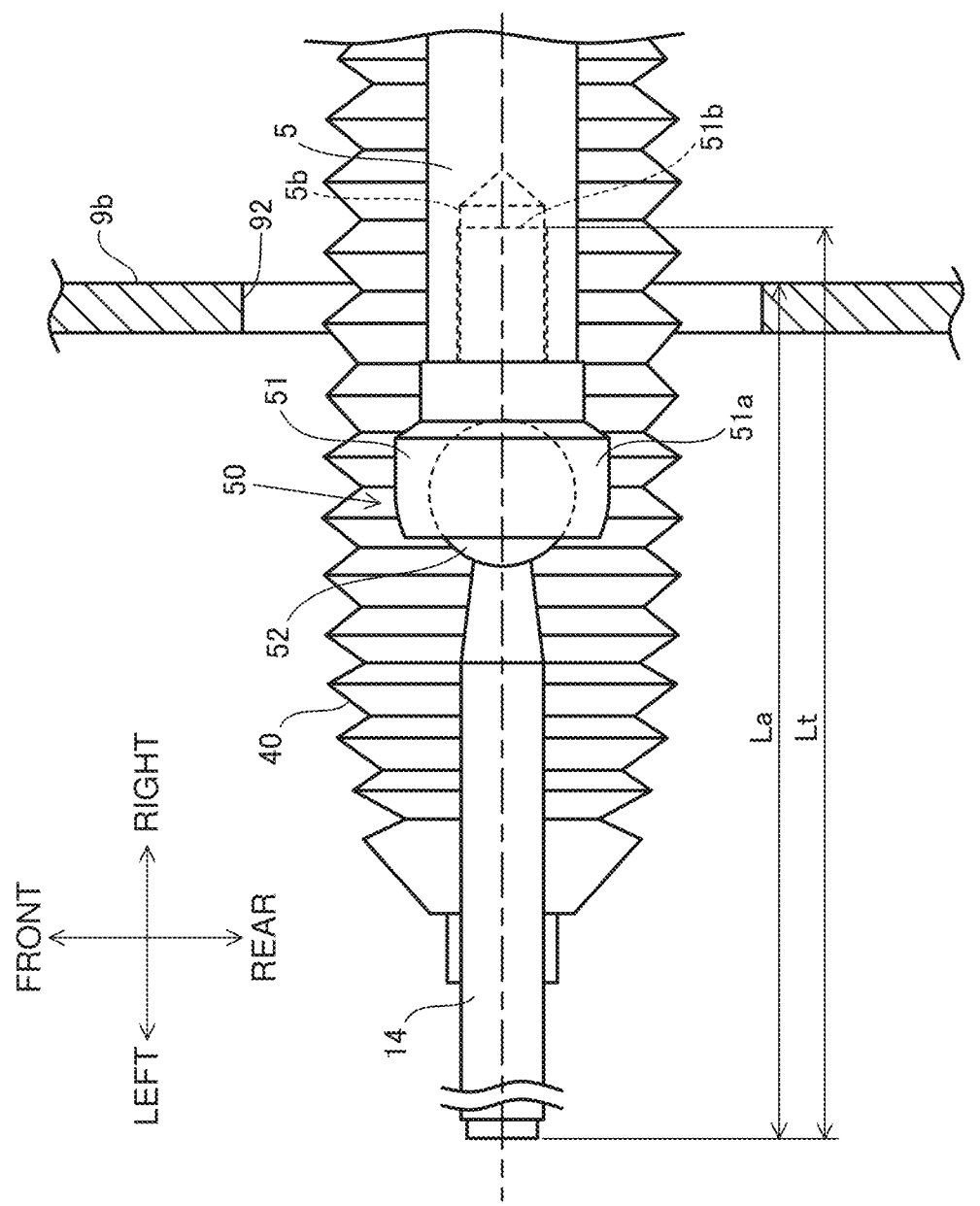
FIG. 4 is a partial enlarged view showing a connecting portion a rack shaft with a tie rod.

FIG. 4 is a partial enlarged view showing a connecting portion the rack shaft 5 with the tie rod 14. The connecting portion where a left end part of the rack shaft 5 arranged inside the steering rack boot 40 and the left tie rod 14 are connected and a positional relationship between this connecting portion and side plate 9b are described with reference to FIG. 4. As shown in FIG. 4, a ball joint 50, which is a universal joint connected to an end part of the rack shaft 5, is provided on an end part of the tie rod 14.

The ball joint 50 includes a socket 51 firmly fixed to the end part of the rack shaft 5 and a ball 52 to be firmly fixed to an end part of a shaft portion of the tie rod 14. The socket 51 includes a ball housing portion 51a for housing the ball 52 and a bolt 51b integrally provided to a base end side of the ball housing portion 51a. An externally threaded portion provided on the bolt 51b is threadably engaged with an internally threaded portion provided in a hole portion 5b extending in the axial direction from the tip surface of the rack shaft 5, whereby the socket 51 is firmly fixed to the rack shaft 5.

The side plate 9b of the vehicle body frame is arranged to the right side of the ball 52 and to the left side of the tip of the bolt 51b. Since the ball 52 serving as a center of rotation of the tie rod 14 is arranged to the left of the opening 92 of (outwardly of) the side plate 9b, a rotation range of the tie rod 14 is not affected by the side plate 9b.

In the present embodiment, the tie rod 14 includes the socket 51. That is, the entire length Lt of the tie rod 14 is a length from the left end of the shaft portion of the tie rod 14 to the tip of the bolt 51b of the socket 51. The entire length Lt of the tie rod 14 is longer than the axial distance La from the right side surface (inner side surface) of the side plate 9b to the left end of the shaft portion of the tie rod 14 (Lt>La). It should be noted that a connecting portion where a right end part of the rack shaft 5 and the right tie rod 14 are connected and a positional relationship between this connecting portion and the side plate 9a are not described since these are similar to those on the left side.

Figure 5:
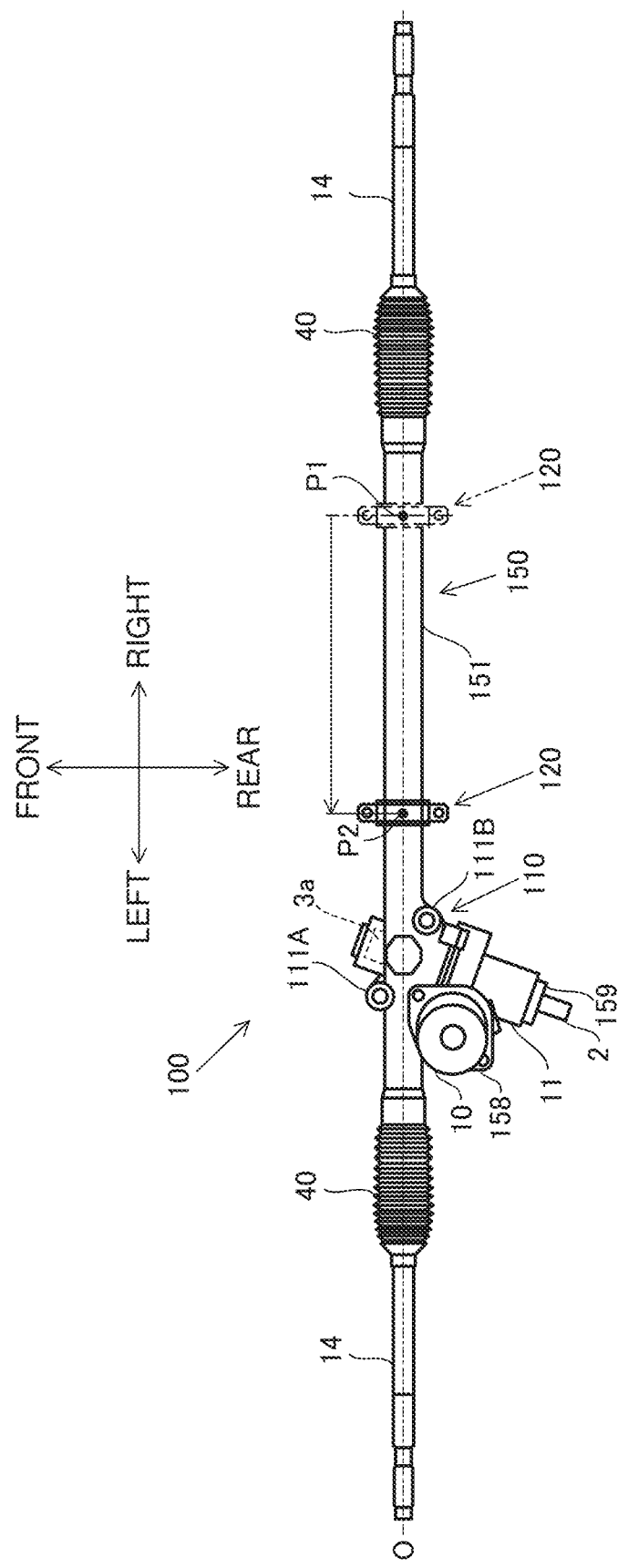
FIG. 5 is a view showing a procedure of moving the second supporting portion performed before the steering device is mounted on a vehicle body.

An example of the procedure of mounting the steering device 100 on the vehicle body is described with reference to FIG. 5 and FIGS. 6A to 6E. FIG. 5 is a view showing the procedure of moving the second supporting portion 120 performed before the steering device 100 is mounted on the vehicle body. FIGS. 6A to 6E are views showing the procedure of mounting the steering device 100 on the vehicle body when the steering device 100 is viewed from behind the vehicle body. It should be noted that the motor housing 158 and the gear housing 159 provided on a left end side of the steering device 100 are not shown.

Figure 6A:
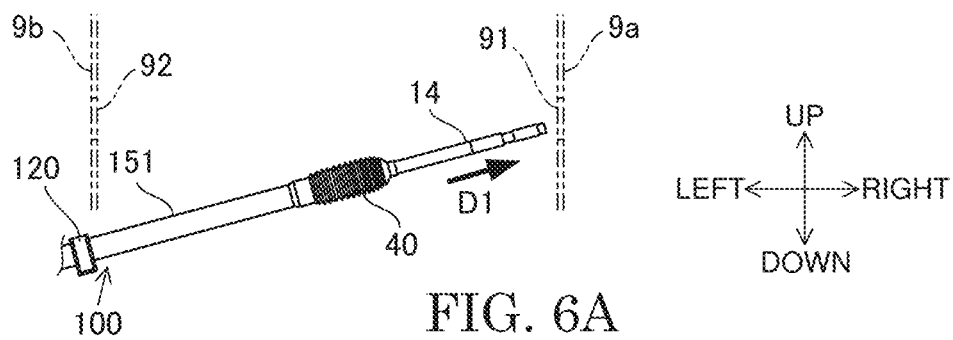
FIG. 6A is a view showing a procedure of positioning the steering device.
Figure 6B:
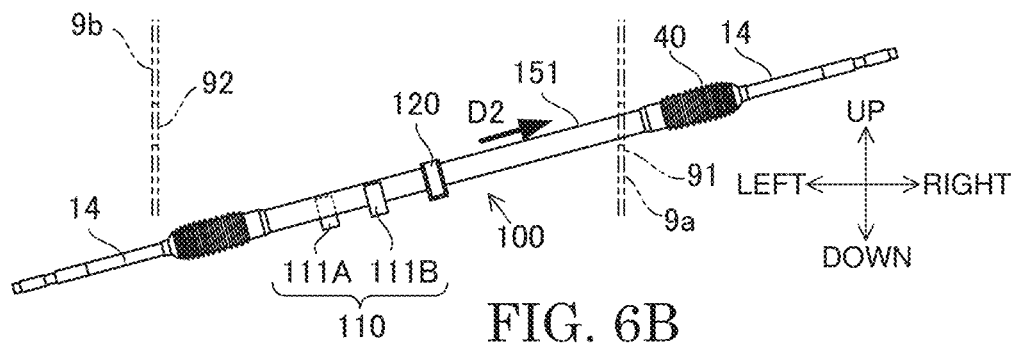
FIG. 6B is a view showing a procedure of inserting a right end side of the steering device through an opening of a side plate.
Figure 6C:
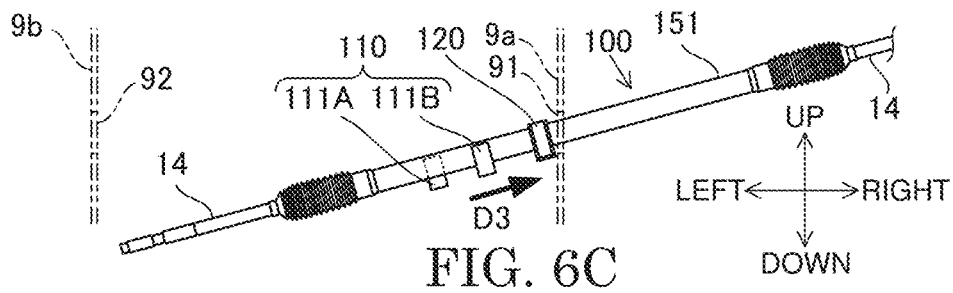
FIG. 6C is a view showing a procedure of positioning the steering device to a rotation initial position.
Figure 6D:
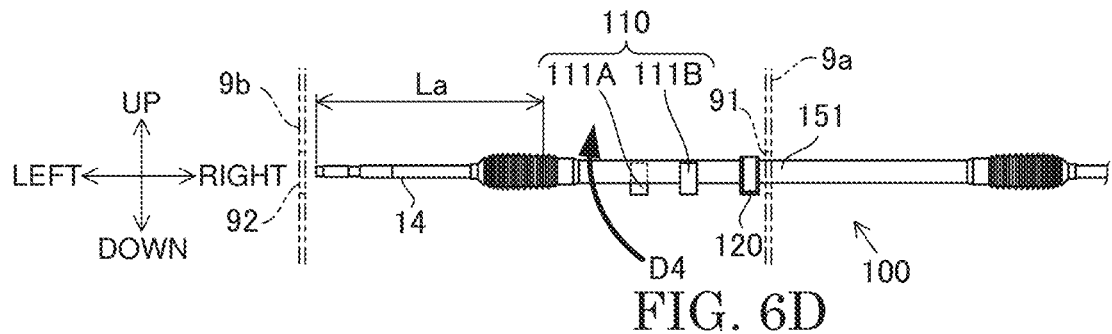
FIG. 6D is a view showing a procedure of rotating the steering device.
Figure 6E:
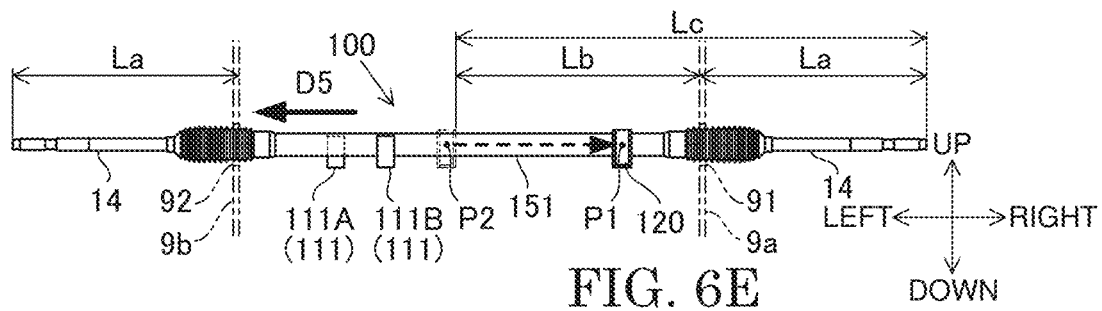
FIG. 6E is a view showing a procedure of inserting a left end side of the steering device through an opening of a side plate.

FIG. 6A is the view showing the procedure of positioning the steering device 100. FIG. 6B is the view showing the procedure of inserting a right end side of the steering device 100 through the opening 91 of the side plate 9a. FIG. 6C is the view showing the procedure of positioning the steering device 100 to a rotation initial position. FIG. 6D is the view showing the procedure of rotating the steering device 100. FIG. 6E is the view showing the procedure of inserting the left end side of the steering device 100 through the opening 92 of the side plate 9b. It should be noted that the vertical and lateral directions of the vehicle body are specified as shown for the convenience of description.

As shown in FIG. 2, a dimension between the pair of side plates 9a, 9b is shorter than the entire length of the steering device 100. The openings 91, 92 of the pair of side plates 9a, 9b are not large enough to allow the insertion of the gear housing 159, the motor housing 158 and the second supporting portion 120. Thus, the right end of the steering device 100 is obliquely inserted through the opening 91 of the side plate 9a by inclining the steering device 100 in an arbitrary direction after the second supporting portion 120 is moved leftward in the axial direction to approach the pinion gear 3a.

As shown in FIG. 5, the worker arranges the second supporting portion 120 at the escaping position (point P2) on the side of the pinion gear 3a by moving the second supporting portion 120 in the axial direction of the rack tube 151 in advance.

As shown in FIG. 6A, the steering device 100 is positioned by being inclined in the vertical direction so that the right end of the steering device 100 is located higher than the left end with respect to the vehicle body. The steering device 100 is moved to a right-upper side (see an arrow D1) of the vehicle body, and the tie rod 14 constituting a right end part of the steering device 100 is inserted through the opening 91.

As shown in FIG. 6B, the steering device 100 is moved to the right-upper side (see the arrow D2) of the vehicle body to insert the steering rack boot 40 into the opening 91.

As shown in FIG. 6C, the steering device 100 is moved to the right-upper side (see an arrow D3) of the vehicle body until the left end of the steering device 100 is located to the right of the side plate 9b. Since an outer diameter of a hollow cylindrical part of the rack tube 151 is sufficiently smaller than the opening width XA of the opening 91, the rack tube 151 can be easily inserted through the opening 91. The steering device 100 is so positioned that the center axis O of the rack tube 151 is located on a center axis of the opening 91 to provide a sufficient clearance between the opening 91 and the rack tube 151.

As shown in FIG. 6D, the left end of the steering device 100 is lifted up with a vertical center of the opening 91 of the side plate 9a serving as a center of rotation to rotate the steering device 100 clockwise as shown (see an arrow D4).

The steering device 100 is rotated until the center axis O of the rack shaft 5 becomes parallel to the lateral direction (i.e. horizontal direction).

As shown in FIG. 6E, the steering device 100 is moved leftward (see an arrow D5) to insert the tie rod 14 constituting a left end part of the steering device 100 through the opening 92. As indicated by a broken line arrow in FIG. 6E, the second supporting portion 120 is moved rightward in the axial direction of the rack tube 151 from the escaping position (point P2) and arranged at the proper position (point P1). The bolt mounting holes 113 of the bolt mounting portions 111 and the bolt mounting holes 123 of the bracket 126 are aligned with the positions of the mounting seats M1 to M3 (see FIG. 2) of the vehicle body frame. The bolt mounting portions 111A, 111B and the mounting seats M1, M2 are fastened and the bracket 126 and the mounting seat M3 are fastened by the bolts and nuts.

In this way, the mounting of the steering device 100 on the vehicle body is completed. It should be noted that an example in which the steering device 100 is inclined in the vertical direction and moved to the right-upper side of the vehicle body such that the right end of the steering device 100 is located higher than the left end with respect to the vehicle body is shown in FIGS. 6A to 6C. However, a direction of inclination and an angle of inclination can be arbitrarily set according to a surrounding structure. For example, the steering device 100 may be inclined in the front-rear direction and moved to a right-front side or right-rear side of the vehicle body such that the right end of the steering device 100 is located in front of or behind the left end with respect to the vehicle body.

In an operation of mounting the steering device 100, the second supporting portion 120 needs to be sufficiently close to the first supporting portion 110 side so as not to interfere with the side plate 9a. In the present embodiment, the escaping position (point P2) is so set that the axial distance Lb from the left side surface of the right side plate 9a to the right end surface of the second supporting portion 120 is longer than the entire length Lt of the tie rod 14. Further, in the present embodiment, the escaping position (point P2) is so set that an axial distance Lc from the tip of the tie rod 14 on the right end side of the rack tube 151 to the right end surface of the second supporting portion 120 is longer than a length of twice the entire length Lt of the tie rod 14. Thus, the interference of the second supporting portion 120 with the side plate 9a can be prevented in the mounting operation.

According to the above embodiment, the following functions and effects are achieved.

(1) The first supporting portion 110 for supporting the one end side of the rack tube 151 by being mounted on the vehicle body is provided on the one end side of the rack tube 151. The second supporting portion 120 for supporting the other end side of the rack tube 151 by being mounted on the vehicle body is provided on the other end side of the rack tube 151. The second supporting portion 120 is mounted on the mounting seat M3 of the vehicle body frame and movable in the axial direction of the rack tube 151 from the proper position (point P1) for fixing the rack tube 151 to the escaping position (point P2) on the side of the pinion gear 3a.

The escaping position (point 2) is a position where the axial distance Lc from the tip of the tie rod 14 on the other end side of the rack tube 151 to the second supporting portion 120 arranged at the escaping position (point P2) is longer than the length of twice the entire length of the tie rod 14. It should be noted that, in a positional relationship with the vehicle body frame, the escaping position (point P2) is a position where the axial distance Lb from the inner side surface of the side plate 9a, through which the tie rod 14 on the other end side of the rack tube 151 is inserted, to the second supporting portion 120 arranged at the escaping position (point P2) is longer than the axial distance La from the inner side surface of the side plate 9b, through which the tie rod 14 on the one end side of the rack tube 151 is inserted, to the tip of the tie rod 14 on the one end side.

In this way, the other end side of the rack tube 151 can be inserted through the opening 91 after the second supporting portion 120 is arranged at the escaping position (point P2) on the one end side of the rack tube 151. Thereafter, the second supporting portion 120 can be arranged at the proper position (point P1) by inserting the one end side of the rack tube 151 through the opening 92 and moving the second supporting portion 120 in the axial direction of the rack tube 151. As just described, in the present embodiment, the steering device 100 can be mounted on the vehicle body by successively inserting the both ends of the steering device 100 through the openings 91, 92 even if the sizes of the openings 91, 92 of the side plates 9a, 9b of the vehicle body frame, through which the both ends of the steering device 100 are to be inserted, are smaller than the second supporting portion 120. Thus, the steering device 100 excellent in mountability on the vehicle body can be provided according to the present embodiment.

(2) The entire length Lt of the tie rod 14 is longer than the axial distance La from the tip of this tie rod 14 to the inner side surface of the side plate 9a, 9b, through which this tie rod 14 is inserted, with the steering device 100 mounted on the vehicle body (Lt>La). Thus, the escaping position (point P2) is located closer to the pinion gear 3a as compared to the case where the entire length Lt of the tie rod 14 is shorter than the axial distance La, wherefore workability in mounting the steering device 100 on the vehicle body is good.

(3) The second supporting portion 120 includes the mounting rubber 125 formed of the elastically deformable material and having the circular opening 125c through which the rack tube 151 is to be inserted, and the bracket 126 for mounting the rack tube 151 on the vehicle body via the mounting rubber 125. Since vibration and impact applied to the rack tube 151 can be absorbed by the elastically deformable mounting rubber (mount member) 125 in this way, the steering device (electric power steering device) 100 can be stably supported.

(4) If the outer peripheral surface of the rack tube 151 is uneven in the range from the proper position (point P1) to the escaping position (point P2), the second supporting portion 120 cannot be smoothly moved in the axial direction of the rack tube 151. In the present embodiment, the outer diameter of the rack tube 151 is uniform from the proper position (point P1) to the escaping position (point P2). In this way, the second supporting portion 120 can be easily moved along the outer peripheral surface of the rack tube 151 and the mounting workability of the steering device 100 on the vehicle body can be improved.

(5) The marks are affixed at the proper position (point P1) and the escaping position (point P2). Thus, the second supporting portion 120 can be easily positioned in the operation of mounting the steering device 100 on the vehicle body. As a result, the mounting workability of the steering device 100 on the vehicle body can be improved.

(6) According to the present embodiment, the steering device 100 can be mounted on various vehicles by adjusting a movable range of the second supporting portion 120 of the steering device 100 for various vehicles in which a distance between the side plates 9a, 9b and the position of the mounting seat M3 of the vehicle body frame are different.

The following modifications are also within the scope of the present invention and it is also possible to combine a configuration shown in any of the modifications and the configuration described in the above embodiment and combine configurations described in the following different modifications.

Modification 1

The shape of the mounting rubber 125 is not limited to that in the above embodiment and various mount members can be employed. For example, a flat rubber bush may be employed or a spherical rubber bush having a curved outer periphery may be employed instead of the flanged rubber bush.

Modification 2

Although an example in which the outer diameter of the rack tube 151 is uniform from the proper position (point P1) to the inner bolt mounting portion 111B of the first supporting portion 110 has been described in the above embodiment, the present invention is not limited to this. At least in a range from the proper position (point P1) to the escaping position (point P2), the outer diameter can be made uniform so as not to provide any projecting part projecting outward from the outer peripheral surface. For example, a positioning projection for aligning the escaping position (point P2) may be provided on the rack tube 151. The positioning projection is provided to project outward from the cylindrical outer peripheral surface of the rack tube 151. In this case, the worker moves the second supporting portion 120 in the axial direction from the proper position (point P1) to the escaping position (point P2) and stops a movement of the second supporting portion 120 when the second supporting portion 120 contacts the positioning projection. In this way, the second supporting portion 120 can be easily positioned at the escaping position (point P2).

Modification 3

Although an example in which the mark is affixed at each of the proper position (point P1) and the escaping position (point P2) has been described in the above embodiment, the present invention is not limited to this. The mark(s) may be omitted at both or one of the proper position (point P1) and the escaping position (point P2).

Modification 4

Although an example in which the openings 91, 92 have a square shape has been described in the above embodiment, the present invention is not limited to this. The openings 91, 92 may be formed into various shapes such as a rectangular shape, a circular shape, an elliptical shape and a polygonal shape.

Modification 5

Although an example in which the first supporting portion 110 includes the outer bolt mounting portion 111A and the inner bolt mounting portion 111B and the steering device 100 is supported on four points has been described in the above embodiment, the present invention is not limited to this. One of the outer and inner bolt mounting portions 111A, 111B may be omitted and the steering device 100 may be supported on three points. Further, the first supporting portion 110 may include three or more bolt mounting portions.

Modification 6

Although an example in which the mounting rubber 125 is fixed to the rack tube 151 by the bracket 126 has been described in the above embodiment, the present invention is not limited to this. For example, the mounting rubber 125 may be fixed to the rack tube 151 by a U-bolt instead of the bracket 126.

Modification 7

Although an example in which the mounting rubber 125 made of rubber is employed as the mount member has been described in the above embodiment, the present invention is not limited to this. Various elastically deformable mount members can be employed.

Modification 8

Although an example in which the balls 52 of the ball joints 50 in the tie rods 14 are arranged outwardly of the pair of side plates 9a, 9b has been described in the above embodiment, the present invention is not limited to this. The steering device 100 may be so arranged that centers of the balls 52 are located in widthwise centers of the openings 91, 92 of the side plates 9a, 9b in the lateral direction.

Modification 9

Although an example in which the steering device 100 is mounted on the vehicle body frame by the bolts and nuts has been described in the above embodiment, the present invention is not limited to this. The steering device 100 may be mounted on the vehicle body frame by other fastening members such as clamps instead of the bolts and nuts or the steering device 100 may be mounted on the vehicle body frame by welding instead of the fastening members. If the fastening members are used, the steering device 100 can be easily mounted and removed, wherefore maintainability is good.

Modification 10

Although an example in which the rack tube 151 has a hollow cylindrical shape has been described in the above embodiment, the present invention is not limited to this. The shape of the rack tube 151 can be one of various shapes having a space for housing the rack shaft 5.

Modification 11

The length from the proper position (point P1) to the escaping position (point P2), i.e. the movable range of the second supporting portion 120, may be longer than the entire length Lt of the tie rod 14. Since the mounting operation can be performed with a margin by setting a sufficient movable range, the mountability of the steering device 100 on the vehicle body can be more improved.

Modification 12

Although an example in which the electric motor 10 is a brushed motor has been described in the above embodiment, the present invention is not limited to this. The electric motor 10 may be configured as a brushless motor including a rotation angle sensor.

Modification 13

Although the electric power steering device has been described as an example in the above embodiment, the present invention can be applied also to a manual steering device including no electric motor 10.

The configuration, functions and effects of the embodiment of the present invention are summarized below.

The steering device 100 includes the rack shaft 5 configured to turn the wheels 6, the pair of tie rods 14 connected to the both end parts of the rack shaft 5, the rack tube 151 serving as the rack housing portion for housing the rack shaft 5, the pinion gear 3a provided on the one end side of the rack tube 151 and configured to transmit a rotational force to the rack shaft 5, the first supporting portion 110 provided on the rack tube 151 and configured to support the one end side of the rack tube 151 by being mounted on the vehicle body, and the second supporting portion 120 provided on the rack tube 151 and configured to support the other end side of the rack tube 151 by being mounted on the vehicle body. The second supporting portion 120 is movable in the axial direction of the rack tube 151 from the proper position (point P1) to the escaping position (point P2) on the side of the pinion gear 3a, the proper position (point P1) being a position where the second supporting portion 120 fixes the rack tube 151 by being mounted on the vehicle body, and the escaping position (point P2) is a position where the distance Lc from the tip of the tie rod 14 on the right end side (other end side) of the rack tube 151 to the second supporting portion 120 is equal to or longer than the length of twice the entire length Lt of the tie rod 14.

In this configuration, the other end side of the rack tube 151 can be inserted through the opening 91 by moving the second supporting portion 120 toward the pinion gear 3a and arranging the second supporting portion 120 at the escaping position (point P2) in mounting the steering device 100 on the vehicle body. Thus, the steering device 100 excellent in mountability on the vehicle body can be provided according to the present embodiment.

In the steering device 100, the second supporting portion 120 includes the mounting rubber 125 serving as the mount member formed of the elastically deformable material and having the circular opening 125c through which the rack tube 151 is to be inserted, and the bracket 126 configured to mount the rack tube 151 on the vehicle body via the mounting rubber 125.

In this configuration, since vibration and impact can be absorbed by the elastically deformable mounting rubber 125, the steering device 100 can be stably supported.

In the steering device 100, the outer diameter of the rack tube 151 is uniform from the proper position (point P1) to the escaping position (point P2).

In this configuration, the second supporting portion 120 can be easily moved along the outer peripheral surface of the rack tube 151 and the mountability of the steering device 100 on the vehicle body can be improved.

In the steering device 100, the entire length Lt of the tie rod 14 is longer than the distance La from the tip of this tie rod 14 to the side plate 9a, 9b of the vehicle body frame, through which this tie rod 14 is inserted.

In this configuration, the escaping position (point P2) is located closer to the pinion gear 3a as compared to the case where the entire length Lt of the tie rod 14 is shorter than the distance from the tip of this tie rod 14 to the side plate 9a, 9b of the vehicle body frame, through which this tie rod 14 is inserted. Thus, workability in mounting the steering device 100 on the vehicle body is good.

The steering device 100 includes the rack shaft 5 configured to turn the wheels 6, the pair of tie rods 14 connected to the both end parts of the rack shaft 5, the rack tube 151 serving as the rack housing portion for housing the rack shaft 5, the pinion gear 3a provided on the one end side of the rack tube 151 and configured to transmit a rotational force to the rack shaft 5, the first supporting portion 110 provided on the rack tube 151 and configured to support the one end side of the rack tube 151 by being mounted on the vehicle body, and the second supporting portion 120 provided on the rack tube 151 and configured to support the other end side of the rack tube 151 by being mounted on the vehicle body. The second supporting portion 120 is movable in the axial direction of the rack tube 151 from the proper position (point P1) where the second supporting portion 120 fixes the rack tube 151 by being mounted on the vehicle body to the escaping position (point P2) on the side of the pinion gear 3a, and the escaping position (point P2) is a position where the distance Lb from the side plate 9a of the vehicle body frame, through which the tie rod 14 on the right end side (other end side) of the rack tube 151 is inserted, to the second supporting portion 120 is longer than the distance La from the side plate 9b of the vehicle body frame, through which the tie rod 14 on the left end side (one end side) of the rack tube 151 is inserted, to the tip of the tie rod 14 on the one end side.

In this configuration, the other end side of the rack tube 151 can be inserted through the opening 91 by moving the second supporting portion 120 toward the pinion gear 3a side and arranged the second supporting portion 120 at the escaping position (point P2) in mounting the steering device 100 on the vehicle body. Thus, the steering device 100 excellent in mountability on the vehicle body can be provided according to the present embodiment.

Embodiments of the present invention were described above, but the above embodiments are merely examples of applications of the present invention, and the technical scope of the present invention is not limited to the specific constitutions of the above embodiments.

This application claims priority based on Japanese Patent Application No. 2017-253605 filed with the Japan Patent Office on Dec. 28, 2017, the entire contents of which are incorporated into this specification by reference.

The invention claimed is:

1. A steering device, comprising:
a rack shaft configured to turn wheels;
a pair of tie rods connected to both end parts of the rack shaft;
a rack housing portion housing the rack shaft;
a pinion gear provided on one end side of the rack housing portion, the pinion gear being configured to transmit a rotational force to the rack shaft;
a first supporting portion provided on the rack housing portion, the first supporting portion being configured to support the one end side of the rack housing portion by being mounted on a vehicle body; and
a second supporting portion provided on the rack housing portion, the second supporting portion being configured to support other end side of the rack housing portion by being mounted on the vehicle body, wherein
the second supporting portion is movable in an axial direction of the rack housing portion from a proper position to an escaping position on the side of the pinion gear, the proper position being a position where the second supporting portion fixes the rack housing portion by being mounted on the vehicle body;
the escaping position is a position where a distance from a tip of the tie rod on the other end side of the rack housing portion to the second supporting portion is equal to or longer than a length of twice the entire length of the tie rod, and
the entire length of the tie rod is longer than a distance from the tip of the tie rod to a side plate of a vehicle body frame, the tie rod being inserted through the side plate.

2. The steering device according to claim 1, wherein the second supporting portion includes a mount member made of an elastically deformable material, the mount member having an opening, through which the rack housing portion is inserted, and a bracket configured to mount the rack housing portion on the vehicle body via the mounting member.

3. The steering device according to claim 1, wherein an outer diameter of the rack housing portion is uniform from the proper position to the escaping position.

* * * * *